June 13, 1961  B. M. BENTON  2,988,688
CONTROL CIRCUITS
Filed Feb. 24, 1958  2 Sheets-Sheet 1

INVENTOR.
BRUCE M. BENTON
BY K. W. Thomas
ATTORNEY

June 13, 1961  B. M. BENTON  2,988,688
CONTROL CIRCUITS
Filed Feb. 24, 1958
2 Sheets-Sheet 2
Fig. 4.
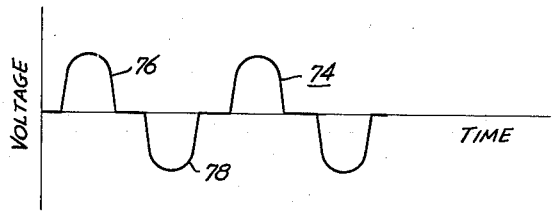
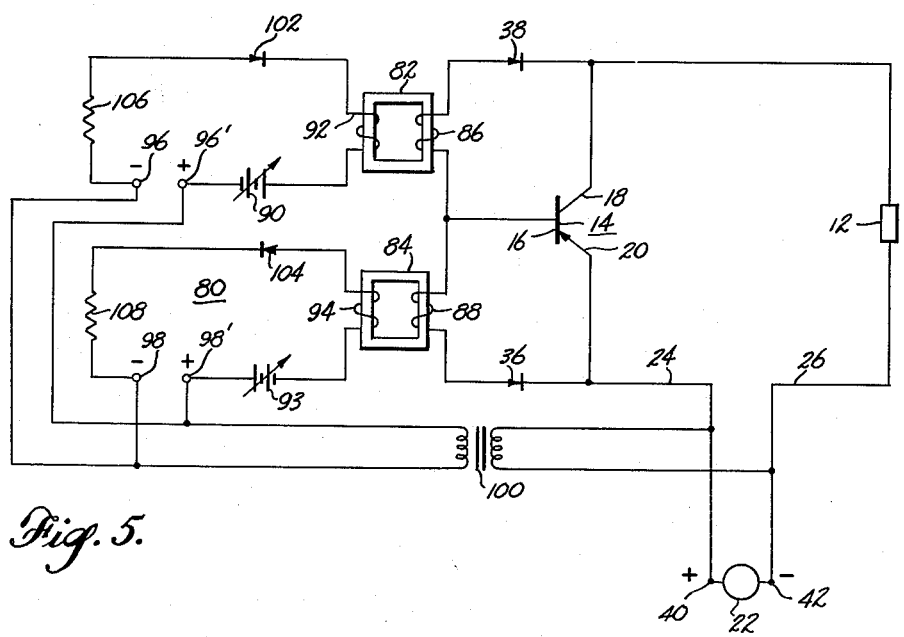
Fig. 5.
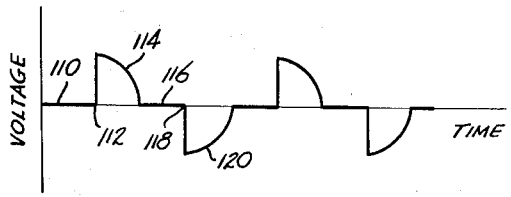
Fig. 6.
INVENTOR.
BRUCE M. BENTON
BY
ATTORNEY United States Patent Office 2,988,688
Patented June 13, 1961

2,988,688
CONTROL CIRCUITS
Bruce M. Benton, Bellevue, Wash., assignor to Boeing Airplane Company, Seattle, Wash., a corporation of Delaware
Filed Feb. 24, 1958, Ser. No. 716,910
8 Claims. (Cl. 323—4)

This invention relates to electrical control circuits, and more particularly, to control circuits utilizing a semiconductor device which functions either as a bilateral conducting switch to control the A.C. energization of a load or as an adjustable impedance to control the average magnitude of the alternating voltage across the load.

As is well-known a mechanical relay is utilized to control the A.C. energization of a load. However, a mechanical relay has several disadvantages. For instance, during the operation of such a relay there is considerable arcing between the relay contacts which prevents its use in an explosive atmosphere. In addition, the arcing reduces the life of the relay, thus increasing maintenance costs. Further, a mechanical relay utilizes a separate load source and a separate control source thus further reducing the reliability of this prior art device.

Transistorized switching circuits have also been provided heretofore for controlling the A.C. energization of a load. However, here again a separate load source and a separate control source is utilized. Therefore, the reliability of such a prior art device is not as high as desired.

An object of this invention is to provide for so controlling a semi-conductor device from a common source of load and control current that the semi-conductor device functions as either a bilateral conducting switch to control the A.C. energization of a load or as an adjustable impedance to control the average magnitude of the voltage across the load.

Another object of this invention is to so control a semi-conductor device, functioning as either an alternating current switch or as an alternating current proportional control, that phase differences between the load voltage and load current do not affect the operation of the semi-conductor device.

A further object of this invention is to provide a more reliable control circuit, utilizing a semi-conductor device as either an alternating-current switch or an alternating-current proportional control device, by controlling the semi-conductor device from a common source of load and control current.

Still another object of this invention is to provide an efficient transistorized circuit for controlling the A.C. energization of a load in a switching manner or for proportionately controlling the average magnitude of the voltage across the load.

A still further object of this invention is to provide, in a control circuit utilizing a semi-conductor device controlled from a common source of load and control current, means for varying the time duration of each load voltage pulse occurring during each half-cycle of the alternating load voltage while still effecting a load voltage pulse of substantially the same wave shape during the load conduction period as the voltage of the common source of load and control current.

Other objects of this invention will become apparent from the following description when taken in conjunction with the accompanying drawings in which:

FIG. 4 is a graph illustrating the wave shape of the alternating voltage appearing across the load when the apparatus and circuits of FIG. 3 are used;

FIG. 5 is a schematic diagram of circuits and apparatus illustrating still another embodiment of the teachings of this invention in which a magnetic amplifier is utilized to control the flow of control current through the semi-conductor device, and FIG. 6 is a graph illustrating the wave shape of the alternating voltage appearing across the load when the device of FIG. 5 is utilized.

Figure 1:
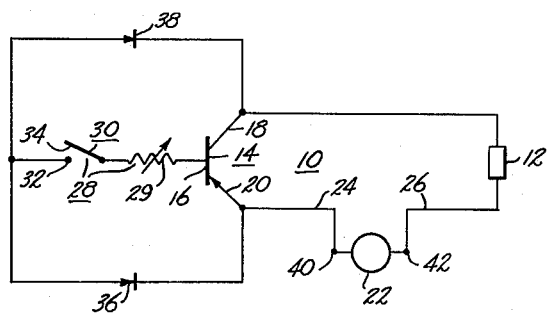
FIG. 1 is a schematic diagram of apparatus and circuits illustrating an embodiment of the teachings of this invention in which a mechanical switch is utilized to effect an A.C. energization of the load.

Referring to FIG. 1 there is illustrated a control circuit 10 for either controlling the A.C. energization of a load 12 in a switching manner or for proportionately controlling the average magnitude of the voltage across the load 12. The control circuit 10 includes a semi-conductor device, specifically a substantially symmetrical P-N-P junction type transistor 14, having a control or base electrode 16 and two load electrodes 18 and 20. As will be explained more fully hereinafter, during one half-cycle of operation the load electrode 18 functions as an emitter electrode and the load electrode 20 functions as a collector electrode, and during the next half-cycle of operation the load electrode 20 functions as an emitter electrode and the load electrode 18 functions as a collector electrode.

In operation, a source 22 of alternating voltage functions as a common source for supplying both load current and control current for the transistor 14. Conductor leads 24 and 26 are adapted to be connected to the source 22 and the leads 24 and 26 are connected in series circuit relationship with the load 12 and with the load electrodes 18 and 20 so as to effect a flow of alternating current through the load 12.

In order to control the flow of control current through the control electrode 16, of the transistor 14, current control means 28 is provided. The current control means 28 includes a variable resistor 29 and a mechanical switch 30 having a stationary contact 32 and a movable contact 34 disposed to be actuated into engagement with the stationary contact 32. The mechanical switch 30 functions to either interrupt the flow of control current through the transistor 14 to thus de-energize the load 12 or to complete a conducting path for the transistor control current to thus energize the load 12. With the switch 30 in the circuit closed position, the variable resistor 20 functions to vary the magnitude of the control current flowing through the control electrode 16 to thus vary the average magnitude of the alternating voltage appearing across the load 12.

For the purpose of effecting a flow of control current from the source 22 through the control electrode 16 during both half-cycles of the alternating voltage of the source 22, when the switch 30 is in the circuit closed position, a blocking rectifier 36 is interconnected between the load electrode 20 and one end of the series circuit including the switch 30 and the variable resistor 29, and a blocking rectifier 38 is interconnected between the same end of the series circuit and the load electrode 18. In other words, the blocking rectifiers 36 and 38 are poled to force the control current from the source 22 through the control electrode 16 and thus prevent a short circuiting out of the transistor 14.

The operation of the control circuit 10 will now be described. Assuming the switch 30 is in the circuit closed position then during the half-cycle of operation when the point 40 is at a positive polarity with respect to the point 42 control current flows from the left end of the source 22, as shown, through the conductor lead 24, the load electrode 20, the control electrode 16, the variable resistor 29, the switch 30, the blocking rectifier 38, the load 12, and the conductor lead 26, to the right end of the source 22, as shown. Such an action renders the transistor 14 conductive and load current flows during the same half-cycle of operation from the left end of the source 22, as shown, through the conductor lead 24, the load electrodes 20 and 18, the load 12, and the conductor lead 26, to the right end of the source 22, as shown.

During the next half-cycle of operation when the point 42 is at a positive polarity with respect to the point 40 control current flows from the right end of the source 22, as shown, through the conductor lead 26, the load 12, the load electrode 18, the control electrode 16, the variable resistor 29, the switch 30, the blocking rectifier 36, and the conductor lead 24, to the left end of the source 22, as shown. This action also renders the transistor 14 conductive and load current flows during this half-cycle of operation from the right end of the source 22, as shown, through the conductor lead 26, the load 12, the load electrodes 18 and 20, and the conductor lead 24, to the left end of the source 22, as shown.

By adjusting the variable resistor 29 so that it offers a minimum of impedance to the flow of control current the transistor 14 can be operated in its saturated state to thus effect a maximum output voltage across the load 12. The magnitude of the voltage appearing across the load 12 can then be decreased by adjusting the resistor 29 so as to offer a higher impedance to the flow of control current. A de-energization of the load 12 is effected by an actuation of the switch 30 to the circuit interrupted position.

It is to be noted that with the switch 30 in the circuit closed position and the variable resistor 29 adjusted so as to provide a low impedance the transistor 14 operates for both half-cycles of operation in its saturated state. The reason for this is that instantaneous load current demand is in constant relationship with the instantaneous control current supplied to the transistor 14. Thus, the control circuit 10 has a high efficiency. When the variable resistor 29 is adjusted so as to offer a high impedance to the flow of control current the transistor 14 is operated in a non-saturated state, however, the constant relationship between semi-conductor control current and load current is still maintained. Thus, the transistor 14 appears as a substantially constant resistance in series with the load 12 and with the source 22. Thus, the efficiency of the control circuit 10 is optimized and the distortion of the wave shape of the voltage across the load 12 is minimized.

It is to be understood that the transistor 14 could be replaced with, for instance, and N-P-N junction type transistor (not shown) provided the rectifiers 36 and 38 were poled opposite to that shown.

Figure 2:
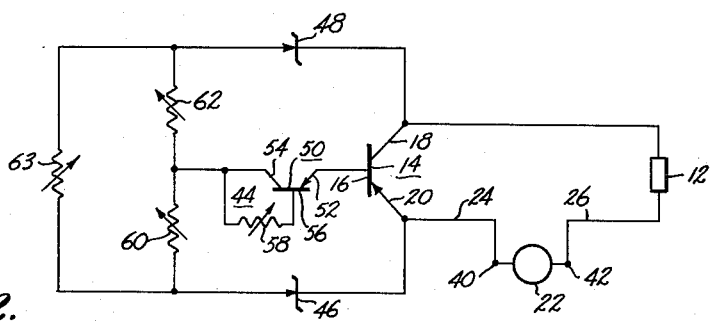
FIG. 2 is a schematic diagram of apparatus and circuits illustrating another embodiment of the teachings of this invention in which a transistor is utilized to control the magnitude of the control current flowing in the semi-conductor device and in which Zener diodes are provided to prevent damage to the semi-conductor device during transient conditions.

Referring to FIG. 2 there is illustrated another embodiment of the teachings of this invention in which like components of FIGS. 1 and 2 have been given the same reference characters. The main distinction between the apparatus and circuits of FIGS. 1 and 2 is that in the apparatus and circuits of FIG. 2 a transistorized current control means 44 has been utilized instead of the current control means 28 of FIG. 1 and Zener diodes 46 and 48 have been utilized instead of the blocking rectifiers 36 and 38, respectively. The transistorized current control means 44 comprises a P-N-P junction type transistor 50, having an emitter electrode 52, a collector electrode 54 and a base electrode 56; and a variable resistor 58 connected between the base electrode 56 and the collector electrode 54 to control the magnitude of the control current flowing through the transistor 50. Thus in operation, when the variable resistor 58 is adjusted so that no control current flows through the control electrode 56 so that the transistor 50 is in the non-conducting state, the load 12 is de-energized. However, an A.C. energization of the load 12 can be effected by adjusting the resistor 58 so that the transistor 50 is rendered conductive thus completing a conducting path for the control current through the semi-conductor device 14. By rendering the transistor 50 fully conductive a maximum of alternating output voltage appears across the load 12. By further adjustment of the variable resistor 58 the magnitude of the alternating voltage appearing across the load 12 can be varied to any desired value.

In operation, the Zener diodes 46 and 48, which have a predetermined breakdown voltage, function to prevent damage to the transistor 14 when the transistor 50 is in the non-conducting state and a transient voltage of relatively high magnitude appears either between the points 40 and 42 or across the load 12. When such a transient voltage occurs between the points 40 and 42 and the polarity of the point 40 is positive with respect to the point 42, the Zener diode 46 breaks down and permits the passage of current from the left end of the source 22, as shown, through the conductor lead 24, the Zener diode 46, in the reverse direction, a parallel circuit one branch of which includes a variable resistor 60 and a variable resistor 62, and the other branch of which includes a variable resistor 63, the Zener diode 48, in the forward direction, the load 12, and the conductor lead 26, to the right end of the source 22, as shown. Thus, since in practice the in circuit resistance value of the resistor 63 is always much smaller than either the combined in circuit resistance value of the resistors 60 and 62 or the resistance value of the load 12 a relatively large portion of the transient voltage appearing between the points 40 and 42 appears across the load 12 thus minimizing the magnitude of the voltage appearing between the load electrodes 18 and 20. During this latter condition of current flow the load 12 in series with the parallel circuit including the resistors 60, 62 and 63 function to limit the flow of current through the Zener diodes 46 and 48. If a transient voltage appears between the points 40 and 42 and the point 42 is at a positive polarity with respect to the point 40 the Zener diode 48 breaks down and current flows from the right end of the source 22, as shown, through the conductor lead 26, the load 12, the Zener diode 48, in the reverse direction, the parallel circuit including the resistors 60, 62 and 63, the Zener diode 46, in the forward direction, and the conductor lead 24, to the left end of the source 22, as shown. If the transient voltage appears as stored energy in the load 12 at a voltage sufficient to break either of the Zener diodes 46 or 48 down this stored energy will be transferred to the source 22 in a similar manner without damage to the transistor 14.

In case the semi-conductor device 14 is not exactly symmetrical the variable resistors 60 and 62 can be adjusted so as to make it appear that the semi-conductor device 14 is symmetrical.

In normal operation when no transient voltage appears between the points 40 and 42 the Zener diodes 46 and 48 function as blocking rectifiers in a manner similar to the way in which blocking rectifiers 36 and 38 of FIG. 1 function. Since the remaining operation of the apparatus of FIG. 2 is similar to the operation of the apparatus of FIG. 1 a further description of such operation is deemed unnecessary.

Figure 3:
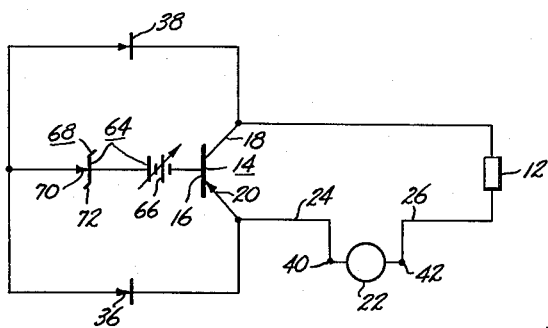
FIG. 3 is a schematic diagram of apparatus and circuits illustrating a further embodiment of the teachings of this invention in which a Zener diode is utilized to control the flow of control current through the semi-conductor device.

Referring to FIG. 3 there is illustrated another embodiment of the teachings of this invention in which like components of FIGS. 1 and 3 have been given same reference characters. The main distinction between the apparatus and circuits of FIGS. 1 and 3 is that in the apparatus and circuits of FIG. 3 a Zener diode type of current control means 64 has been substituted for the current control means 28 of FIG. 1.

As illustrated, the current control means 64 comprises a variable direct-current control source 66 and a Zener diode 68 having a predetermined breakdown voltage and a positive terminal 70 and a negative terminal 72. The Zener diode 68 is connected in series circuit relationship with the control source 66, one end of the series circuit being connected to the control electrode 16, of the semi-conductor device 14, and the other end of the series circuit being connected to the junction point of the blocking rectifiers 36 and 38.

It is to be understood that the direct-current control source 66 could be inserted on the left side of the Zener diode 68 instead of on the right side of the Zener diode 68, as shown.

In operation, the output voltage of the source 22 acts in series with the output voltage of the direct-current control source 66, the output voltage of the source 22 of itself not being of sufficient value to effect a breakdown of the Zener diode 68. Therefore, when the source 66 is adjusted so that its output voltage is of zero magnitude the load 12 is de-energized. However, when the source 66 is adjusted to have an output voltage the combined magnitude of the output voltages of the sources 66 and 22 can reach the breakdown voltage of the Zener diode 68 to thus permit the flow of control current through the control electrode 16 of the semi-conductor 14. Thus, under the latter condition an output voltage is produced across the load 12 such as represented by the curve 74 in FIG. 4. The width of the pulses 76 and 78 and thus their time duration is determined by the setting of the direct-current control source 66. The smaller the output voltage of the control source 66 the shorter the time duration of the pulses 76 and 78. In fact, as hereinbefore mentioned, if the output voltage of the control source 66 is reduced to zero the load 12 becomes de-energized. Thus, the control circuit of FIG. 3 can either function to effect an energization or de-energization of the load 12 in a switching manner or the semi-conductor device 14 of FIG. 3 can function as a proportional control to control the average magnitude of the voltage appearing across the load 12. From the foregoing description of the control circuit of FIG. 3 it can be realized that the on time of the conduction pulses 76 and 78 can be varied to thus vary the magnitude of the average voltage, current or power at the load 12 without controlling the magnitude of the output of the source 22 while at the same time maintaining the characteristic wave shape of the output voltage or output current of the source 22 during each portion of the conduction cycle at the load 12.

Referring to FIG. 5 there is illustrated still another embodiment of the teaching of this invention in which like components of FIGS. 1 and 5 have been given the same reference characters. The main distinction between the circuits and apparatus FIGS. 1 and 5 is that in the circuits and apparatus of FIG. 5 the control current through the control electrode 16, of the semi-conductor device 14, is controlled by means of a full-wave magnetic amplifier 80.

The magnetic amplifier 80 includes two magnetic core members 82 and 84 which have disposed in inductive relationship therewith load windings 86 and 88, respectively. As illustrated, the load winding 86 is connected in series circuit relationship with the blocking rectifier 38, one end of the series circuit being connected to the control electrode 16 and the other end of the series circuit being connected to the load electrode 18. In like manner, the load winding 88 is connected in series circuit relationship with the blocking rectifier 36, one end of the latter series circuit being connected to the control electrode 16 and the other end of the series circuit being connected to the load electrode 20.

In order to vary the flux level in the magnetic core member 82 in accordance with the output voltage of a variable direct-current control source 90 a control winding 92 is disposed in inductive relationship with the magnetic core member 82. In like manner, in order to vary the flux level in the magnetic core member 84 in accordance with the magnitude of the output voltage of a variable direct-current control source 93 a control winding 94 is disposed in inductive relationship with the magnetic core member 84.

In order to apply an alternating reference voltage to terminals 96 and 96' and to terminals 98 and 98' a potential transformer 100 is interconnected between the source 22 and the terminals 96 and 96' and the terminals 98 and 98'. As will be explained more fully hereinafter, the reference voltage appearing across the terminals 96 and 96' in cooperation with the output voltage of the control source 90 determines the flux level to which the magnetic core member 82 is reset. On the other hand, the reference voltage appearing between the terminals 98 and 98' in cooperation with the output voltage of the control source 93 determines the flux level to which the magnetic core member 84 is reset.

For the purpose of blocking the flow of control current through the control winding 92 during alternate half-cycles of operation a blocking rectifier 102 is connected in series circuit relationship with the control winding 92. Similarly, a blocking rectifier 104 is connected in series circuit relationship with the control winding 94 to block the flow of control current through the control winding 94 during the other alternate half-cycles of operation.

A current-limiting resistor 106 is connected in series circuit relationship with the blocking rectifier 102 and with the control winding 92 in order to limit the flow of current through the control winding 92 when the magnetic core member 82 has been reset to negative saturation. In like manner, a current-limiting resistor 108 is connected in series circuit relationship with the blocking rectifier 104 and with the control winding 94 in order to limit the flow of current through the control winding 94 when the magnetic core member 84 has been reset to negative saturation.

The operation of the control circuit of FIG. 5 will now be described. Assuming the control sources 90 and 93 have been adjusted so as to effect a resetting of the magnetic core members 82 and 84, respectively, to a level half way between negative and positive saturation and assuming further that the polarity of the voltages between the terminals 96 and 96', between the terminals 98 and 98', and between the points 40 and 42 is as shown in FIG. 5 then magnetizing current will flow from the left end of the source 22, as shown, through the conductor lead 24, the load electrode 20, the control electrode 16, the load winding 86, the blocking rectifier 38, in the forward direction, the load 12, and the conductor lead 26, to the right end of the source 22, as shown. This magnetizing current is not of sufficient magnitude to render the semi-conductor 14 conductive and therefore only voltage produced by the flow of magnetizing current appears across the load 12. This portion of the operation is presented at 110 in FIG. 6. However, once the point in time as represented at 112 FIG. 6 is reached the magnetic core member 82 saturates and therefore the impedance of the load winding 86 decreases and sufficient control current then flows from the source 22 through this latter described conducting path to thereby render the transistor 14 conductive. When the transistor 14 is rendered conductive load current flows from the left end of the source 22, as shown, through the conductor lead 24, the load electrodes 20 and 18, the load 12, and the conductor lead 26, to the right end of the source 22, as shown, to thus produce a voltage across the load 12 as represented at 114 in FIG. 6 provided the output voltage of the source 22 is of sinusoidal shape.

During this same half-cycle of operation the combined voltage appearing across the terminals 98 and 98' and at the output of the control source 93 effects a flow of control current through the control winding 94, the blocking rectifier 104, in the forward direction, and the current-limiting resistor 108 to thus effect a resetting of the magnetic core member 84 to a flux level half way between positive and negative saturation.

During the next half-cycle of operation when the polarity of the voltages between the terminals 96 and 96', between the terminals 98 and 98', and between the points 40 and 42 is opposite to that shown in FIG. 5 magnetizing current flows from the right end of the source 22, as shown through the conductor lead 26, the load 12, the load electrode 18, the control electrode 16, the load winding 88, the blocking rectifier 36, in the forward direction, and the conductor lead 24, to the left end of the source 22, as shown. The voltage appearing across the load 12 during the time this latter magnetizing current is flowing is represented at 116 in FIG. 6.

Magnetizing current continues to flow through the load winding 88 until a time is reached as represented at 118 in FIG. 6 at which time the magnetic core member 84 becomes saturated, thereby decreasing the impedance of the load winding 88, to thus permit the flow of control current from the source 22 through this same magnetizing current path. When such control current flows through the semi-conductor device 14 it is rendered conductive and load current flows from the right end of the source 22, as shown, through the conductor lead 26, the load 12, the load electrodes 18 and 20 and the conductor lead 24, to the left end of the source 22, as shown, to thereby produce a voltage across the load 12 as represented at 120 in FIG. 6.

During this same half-cycle of operation when the terminal 96 is at a positive polarity with respect to the terminal 96' the voltage at the output of the control source 90 combined with the voltage appearing across the terminals 96 and 96' effects a resetting of the magnetic core member 82 to a flux level half way between positive and negative saturation. During the next succeeding cycles of operation the above described operation is repeated during each cycle of operation.

If the control sources 90 and 93 are adjusted so that their output voltages are of zero magnitude the reference voltages appearing between the terminals 96 and 96' and between the terminals 98 and 98' effect a complete resetting of the magnetic core members 82 and 84 to negative saturation thus preventing the flow of control current through the semi-conductor device 14 during each half-cycle of operation. Therefore, the semi-conductor device 14 is not rendered conductive and the load 12 is not energized. Thus, the semi-conductor device can function as a bilateral conducting switch to energize and de-energize the load 12. The time duration of the pulses 114 and 120 can be varied by adjusting the control sources 90 and 93 so as to effect different output voltages for the sources 90 and 93. Specifically, if the control sources 90 and 93 are adjusted so as to effect voltages at their outputs of lesser magnitude then as represented by the output voltage as shown in FIG. 6 then the time duration of the pulses corresponding to the pulses 114 and 120 will be less. In case the semi-conductor device 14 is not exactly symmetrical it can be made to appear symmetrical by proper adjustment of the control sources 90 and 93.

It is to be understood that the blocking rectifiers 36 and 38 shown in FIGS. 1 and 3 could be replaced by suitable resistors (not shown) provided the amplification of the semi-conductor device 14 is sufficiently high. It is also to be understood that in the case of the apparatus and circuits of FIGS. 1, 2, and 5 the output voltage of the source 22 can be of any wave shape and a similar wave shape will appear across the load 12 during the load conduction portion of the operation unless the control circuit or the semi-conductor device 14 is such as to prevent an energization of the load 12. However, in the case of the apparatus and circuits of FIG. 3 the output voltage of the source 22 should be of varying magnitude.

The apparatus embodying the teachings of this invention has several advantages. For instance, the semi-conductor device 14 is substantially insensitive to phase angle differences between the voltage appearing across the load and the current flowing through the load 12, which phase differences would be produced by a reactive type of load. In addition, the apparatus of this invention is more reliable since the common source 22 is utilized to effect both a flow of load and control current through the semi-conductor device 14. Further, high efficiency is obtained for the apparatus of this invention by utilizing the same wave shape for both the load and control current flowing the semi-conductor device 14. The time duration of the pulses appearing across the load 12 in the case of the apparatus and circuits of FIG. 3 and 5 can be varied to thus vary the magnitude of the average voltage, current or power to the load 12 without controlling the magnitude of the output current or voltage of the source 22 while at the same time maintaining during the load conduction portion of the cycle a voltage across the load 12 which has substantially the same wave shape as the output voltage of the source 22.

Since certain changes may be made in the above described apparatus and circuits and different embodiments of the invention may be made without departing from the spirit and scope thereof, it is intended that all matter contained in the above description or shown in the accompanying drawings shall be interpreted as illustrated and not in a limiting sense.

I claim as my invention:

1. In a control circuit for controlling the flow of alternating current through a load, the combination comprising, a semi-conductor device including a control electrode and two load electrodes, conductor leads adapted to be connected to a source of alternating voltage, a series circuit for effecting the flow of alternating load current through said two load electrodes and said load, said series circuit including said conductor leads, said load and said two load electrodes, a second series circuit including a variable impedance member and a mechanical switch having a circuit open and a circuit closed position, one end of said second series circuit being connected to said control electrode, a rectifier connected between the other end of said second series circuit and one of said two load electrodes, and another rectifier connected between said other end of said second series circuit and the other of said two load electrodes, said rectifiers being poled so as to effect, when said mechanical switch is in the circuit closed position, a flow of control current from said source through said control electrode during both half-cycles of said alternating voltage.

2. In a control circuit for controlling the flow of alternating current through a load, the combination comprising, a semi-conductor device including a control electrode and two load electrodes, conductor leads adapted to be connected to a source of alternating voltage, a series circuit for effecting the flow of alternating load current through said two load electrodes and said load, said series circuit including said conductor leads, said load and said two load electrodes, a second series circuit including current control means, one end of said second series circuit being connected to said control electrode, a voltage-reference diode, having a predetermined breakdown voltage, connected between the other end of said second series circuit and one of said two load electrodes, and another voltage-reference diode, having a predetermined breakdown voltage, connected between said other end of said second series circuit and the other of said two load electrodes, said voltage-reference diodes being poled to effect in cooperation with said current control means a flow of control current from said source through said control electrode during both half-cycles of said alternating voltage.

3. In a control circuit for controlling the flow of alternating current through a load, the combination comprising, a semi-conductor device including a control electrode and two load electrodes, conductor leads adapted to be connected to a source of alternating voltage, a series circuit for effecting the flow of alternating load current through said two load electrodes and said load, said series circuit including said conductor leads, said load and said two load electrodes, a second series circuit including current control means, one end of said second series circuit being connected to said control electrode, a parallel circuit one branch of which includes a first impedance member and the other branch of which includes a second impedance member connected in series circuit relationship with a third impedance member, the other end of said second series circuit being connected to the junction point of said second impedance member and said third impedance member, circuit means, including a Zener diode, having a predetermined breakdown voltage, connected between one end of said parallel circuit and one of said two load electrodes, and other circuit means, including another Zener diode, having a predetermined breakdown voltage, connected between the other end of said parallel circuit and the other of said two load electrodes, said Zener diodes being poled to effect in cooperation with said current control means a flow of control current from said source through said control electrode during both half-cycles of said alternating voltage.

4. In a control circuit for controlling the flow of alternating current through a load, the combination comprising, a semi-conductor device including a control electrode and two load electrodes, conductor leads adapted to be connected to a source of alternating voltage, a series circuit for effecting the flow of alternating load current through said two load electrodes and said load, said series circuit including said conductor leads, said load and said two load electrodes, a magnetic amplifier including a first and a second load winding, circuit means, including a rectifier and said first load winding, interconnected between said control electrode and one of said two load electrodes so that control current can flow, during one half-cycle of said alternating voltage, from said source through the other of said two load electrodes, said control electrode, said first load winding, said rectifier, in the forward direction, and said load, other circuit means, including another rectifier and said second load winding, interconnected between said control electrode and said other of said two load electrodes so that control current can flow, during the next half-cycle of said alternating voltage, from said source through said load, said one of said two load electrodes, said control electrode, said second load winding and said another rectifier, in the forward direction, and means for controlling the flow of said control current through said first load winding and through said second load winding.

5. In a control circuit for controlling the flow of the alternating current through a load, the combination comprising, a semi-conductor device including a control electrode and two load electrodes, conductor leads adapted to be connected to a source of alternating voltage, a series circuit for effecting the flow of alternating load current through said two load electrodes and said load, said series circuit including said conductor leads, said load and said two load electrodes, another series circuit including a variable source of direct-current voltage and a Zener diode having a predetermined breakdown voltage, one end of said another series circuit being connected to said control electrode, circuit means including a rectifier, interconnected between the other end of said another series circuit and one of said two load electrodes, and other circuit means, including another rectifier, interconnected between said other end of said another series circuit and the other of said two load electrodes, said rectifiers being poled to effect, when said Zener diode is in its breakdown condition, the flow of control current from said source through said control electrode during both half-cycles of said alternating voltage.

6. In a control circuit for controlling the flow of alternating current through a load as received from a source of alternating voltage, the combination comprising, a semi-conductor device including a control electrode and two load electrodes, circuit means for connecting said load and said two load electrodes in series circuit relationship with respect to said source so as to effect a flow of alternating load current from said source through said load and through said two load electrodes, current control means connected to said control electrode, first control rectifying means interconnected between said current control means and one of said two load electrodes, second control rectifying means interconnected between said current control means and the other of said two load electrodes, said first and said second control rectifying means being so poled as to effect a flow of control current from said source through said control electrode during both half-cycles of said alternating voltage and being so poled as to permit said current control means to control the flow of current through said control electrode.

7. In a control circuit for controlling the flow of alternating current through a load, the combination comprising, a semi-conductor device including a control electrode and two load electrodes, conductor leads adapted to be connected to a source of alternating voltage, a series circuit for effecting the flow of alternating load current through said two load electrodes and said load, said series circuit including said conductor leads, said load and said two load electrodes, a second series circuit including current control means, one end of said second series circuit being connected to said control electrode, a rectifier connected between the other end of said second series circuit and one of said two load electrodes, and another rectifier connected between said other end of said second series circuit and the other of said two load electrodes, said rectifiers being poled so as to effect a flow of control current from said source through said control electrode during both half-cycles of said alternating voltage.

8. In a control circuit for controlling the flow of alternating current through a load, the combination comprising, a semi-conductor device including a control electrode and two load electrodes, conductor leads adapted to be connected to a source of alternating voltage, a series circuit for effecting the flow of alternating load current through said two load electrodes and said load, said series circuit including said conductor leads, said load and said two load electrodes, a second series circuit including current switching means, one end of said second series circuit being connected to said control electrode, a rectifier connected between the other end of said second series circuit and one of said two load electrodes, and another rectifier connected between said other end of said second series circuit and the other of said two load electrodes, said rectifiers being poled so as to effect, when said current switching means is in the current conductive condition, a flow of control current from said source through said control electrode during both half-cycles of said alternating voltage.

References Cited in the file of this patent

UNITED STATES PATENTS

| | | |
|---|---|---|
| 2,691,073 | Lowman | Oct. 5, 1954 |
| 2,763,832 | Shockley | Sept. 18, 1956 |
| 2,774,888 | Trousdale | Dec. 18, 1956 |